United States Patent
Shen et al.

(10) Patent No.: US 10,081,269 B2
(45) Date of Patent: Sep. 25, 2018

(54) BUSHING ASSEMBLY AND VEHICLE SEAT ASSEMBLY EMPLOYING THE SAME

(71) Applicant: FORD GLOBAL TECHNOLOGIES, LLC, Dearborn, MI (US)

(72) Inventors: Jacob Shen, Wuhu (CN); Sophia Ouyang, Nanjing (CN); Luther Wang, Nanjing (CN); Colin Cai, Nanjing (CN)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/137,053

(22) Filed: Apr. 25, 2016

(65) Prior Publication Data

US 2016/0332537 A1 Nov. 17, 2016

(30) Foreign Application Priority Data

May 12, 2015 (CN) .......................... 2015 1 0239679

(51) Int. Cl.
*B60N 2/015* (2006.01)
*B60N 2/68* (2006.01)

(52) U.S. Cl.
CPC .............. *B60N 2/015* (2013.01); *B60N 2/682* (2013.01)

(58) Field of Classification Search
CPC ... B60N 2/015; B60N 2/682; B60N 2002/684
See application file for complete search history.

(56) References Cited

U.S. PATENT DOCUMENTS

| | | | | |
|---|---|---|---|---|
| 4,883,319 A | * | 11/1989 | Scott | ................. B60N 2/22 16/2.1 |
| 4,921,384 A | * | 5/1990 | Nordyke | ................. F16B 19/05 411/361 |
| 5,263,763 A | | 11/1993 | Billette | |
| 5,634,689 A | * | 6/1997 | Putsch | ................. B60N 2/2252 297/362 |
| 5,826,944 A | * | 10/1998 | Beneker | .................. B60N 2/68 297/440.2 |
| 6,361,239 B1 | * | 3/2002 | Parikh | ................. B60N 2/682 297/15 |
| 7,073,861 B2 | | 7/2006 | Ichikawa et al. | |
| 8,678,496 B2 | * | 3/2014 | Zorine | ................. B60N 2/3013 297/248 |
| 8,857,913 B2 | * | 10/2014 | Schuhmacher | ...... B60N 2/2356 16/2.1 |
| 2008/0163453 A1 | * | 7/2008 | Joseph | .................. F16F 1/373 16/2.1 |
| 2012/0192379 A1 | * | 8/2012 | Amirian | .............. F24F 13/0227 16/2.5 |
| 2012/0306253 A1 | * | 12/2012 | Seibold | .................. B60N 2/68 297/354.1 |

* cited by examiner

*Primary Examiner* — Philip F Gabler
(74) *Attorney, Agent, or Firm* — Vichit Chea; Price Heneveld LLP

(57) ABSTRACT

The present invention in one or more embodiments provides a bushing assembly to support a seat frame, where the bushing assembly includes first and second bushings connected to first and opposing second sides of the seat frame. The first and second bushings are comprised of first and second polymeric materials and include first and second support portions with first and second longitudinal lengths along a longitudinal direction, respectively, wherein the first longitudinal length differs than the second longitudinal length.

5 Claims, 4 Drawing Sheets

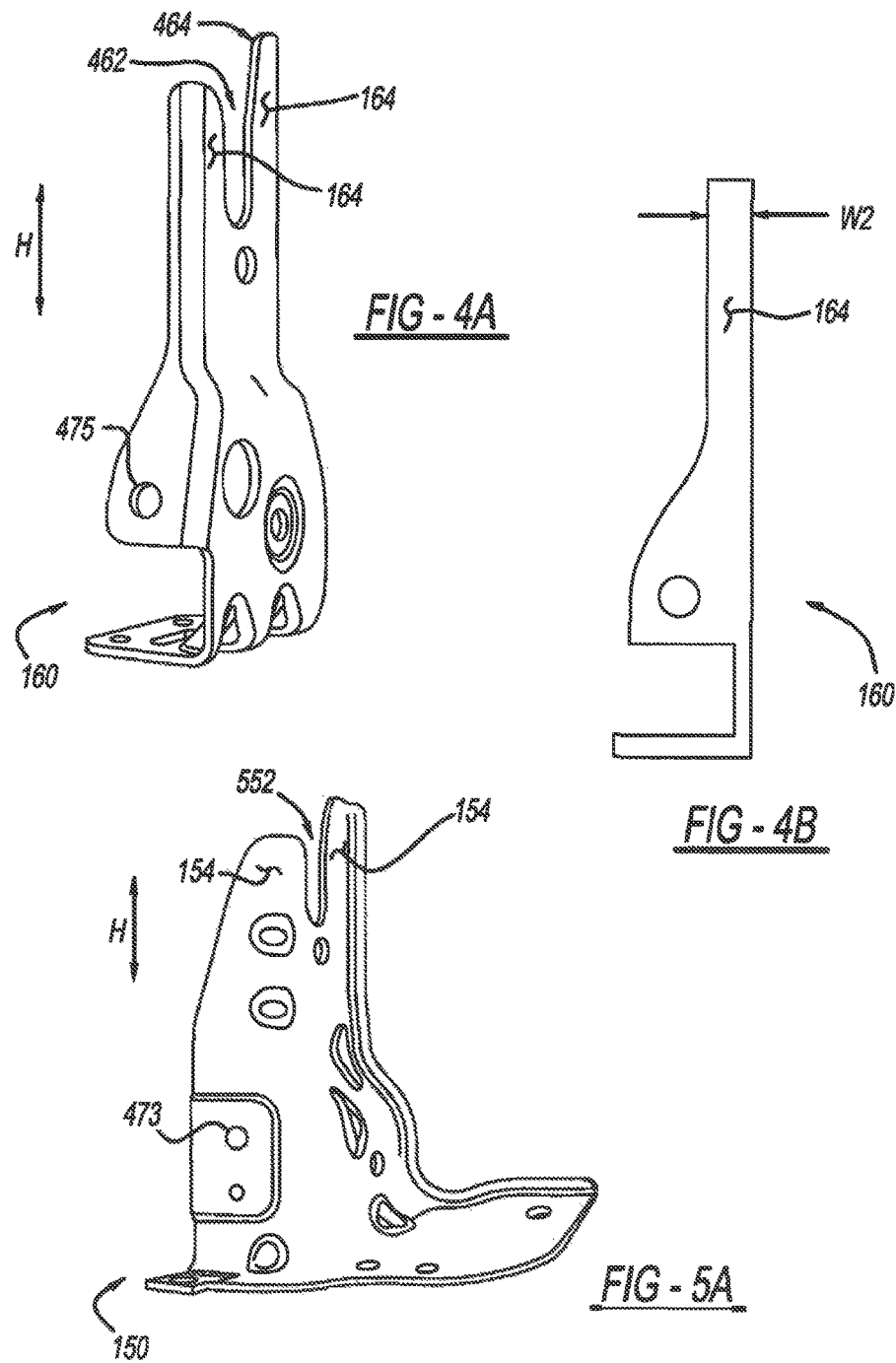

BUSHING ASSEMBLY AND VEHICLE SEAT ASSEMBLY EMPLOYING THE SAME

RELATED APPLICATION

This application claims the benefit under 35 U.S.C. § 119(b) of Chinese New Invention Patent Application No. CN 201510239679.4, filed May 12, 2015, entitled "Bushing Assembly and Vehicle Seat Assembly Employing the Same," the entire contents thereof being incorporated herein by reference.

FIELD OF THE INVENTION

The present invention generally relates to a bushing assembly and a vehicle seat assembly employing the same.

BACKGROUND OF THE INVENTION

Often vehicle seats are pivotably connected to the vehicle body via connectors, where a regular pivot connection may be realized by a bracket and an axis rotatably connected to the bracket.

For instance, U.S. Pat. No. 5,263,763 discloses a vehicle seat mounting bracket for mounting a rear seat back to a vehicle floor. The bracket has a circular opening and a shaft is provided with an integral ring to retain the seat back in the bracket to avoid rattles and noise.

In addition, U.S. Pat. No. 7,073,861 discloses a hinge bracket for a seat back, where a hinge shaft is connected to the hinge bracket via cylindrical collars.

SUMMARY OF THE INVENTION

In one or more embodiments, a bushing assembly is provided to support a seat frame, where the bushing assembly includes first and second bushings to be connected to first and opposing second sides of the seat frame, including first and second polymeric materials, and including first and second support portions with first and second longitudinal lengths along a longitudinal direction, respectively, wherein the first longitudinal length differs than the second longitudinal length.

The second bushing may further include a first guiding portion positioned next to the second support portion along the longitudinal direction, a cross section of the first guiding portion being greater than that of the second support portion in circumference or radial dimension. The second bushing may further include a second guiding portion such that the second support portion is positioned between the first guiding portion and the second guiding portion along the longitudinal direction. Optionally, at least one of the first and second guiding portions includes a first cross section and a second cross section positioned between the first cross section and the second support portion, the second cross section being smaller in circumference or radial dimension than the first cross section.

The first bushing may include a stop portion, a cross section of the stop portion being different from the first support portion in at least one of circumference and radial dimension. The stop portion may be positioned between the seat frame and the second support portion. The first bushing may further include a flange, the first support portion being positioned between the flange and the stop portion, a cross section of the flange being different from the first support portion in at least one of circumference and radial dimension.

The bushing assembly may further include first and second metallic rods to be received through the first and second bushings and to contact the first and opposing second sides of the seat frame, respectively, such that the first and second bushings are to connect with the seat frame via the first and second metallic rods, respectively. The first and second metallic rods may each include a fastening portion.

In another additional embedment, a vehicle seat assembly is provided to include a seat frame and a bushing assembly described herein to be connected to the seat frame.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4A is an enlarged side view of a second vehicle bracket to engage the second bushing depicted in FIG. 2 in accordance with the present disclosure;

FIG. 4B is a cross-sectional view of the second vehicle bracket depicted in FIG. 4A in accordance with the present disclosure;

FIG. 5A is an enlarged side view of a first vehicle bracket to engage the first bushing depicted in FIG. 3 in accordance with the present disclosure;

DETAILED DESCRIPTION OF THE PREFERRED EMBODIMENTS

Figure 1A:
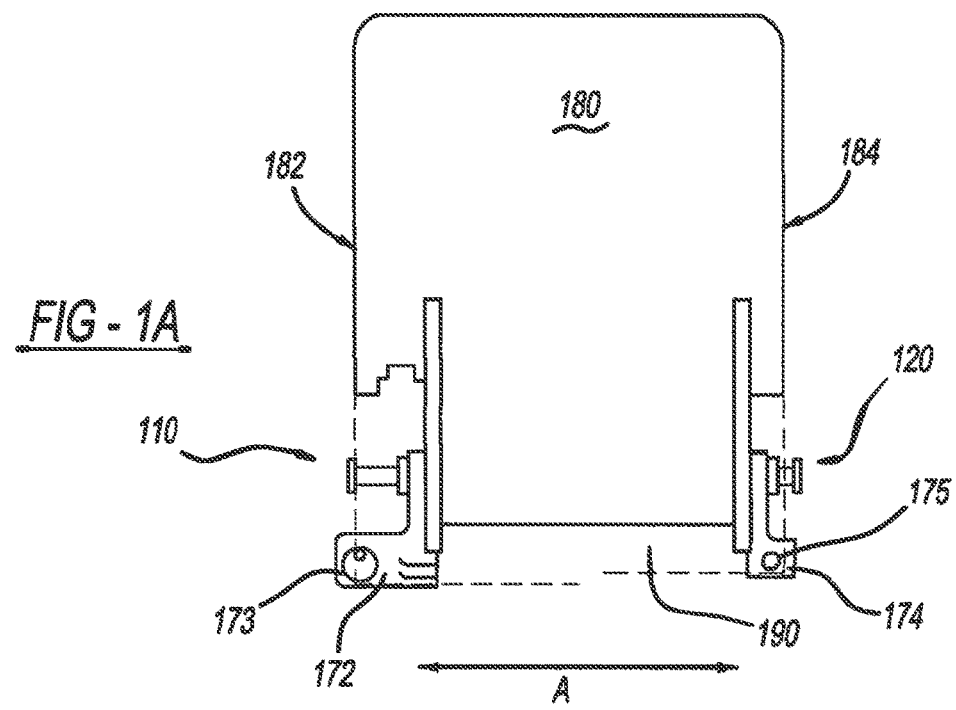
FIG. 1A is a front view of a pre-assembled seat frame that may be connected and fixed to the vehicle floor via a bushing assembly in accordance with the present disclosure.

As referenced in the figures, the same reference numerals may be used herein to refer to the same parameters and components or their similar modifications and alternatives. For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale.

During vehicle assembly and manufacture, many of the steps may require manual assembly, including manual assembly of vehicle seats, which is often prone to human error. Without wanting to be limited to any particular theory, it is believed that misorientation of seat frame involved in seat assembly may be due to human error associated with manual installation. Particularly, and in certain instances, the seat frame may have been pre-assembled with its seat cushion and fabrics such that any resulting assembly joints and connection points may not be readily visible to an operator. Therefore, during assembly of the seat frame, it is often difficult to properly position the seat frame for installation or to make sure if the seat frame has been placed in its intended location. Particularly, issues may occur as desirable installation may not be realized concurrently at both sides of the seat frame. And if it does occur, other problems, like structural damage, rattling, pivot failure, may follow. As detailed herein or elsewhere, the present invention with one or more embodiments advantageously provides a bushing assembly to assist with seat installation with greater time efficiency and less human error.

FIG. 1A illustratively depicts a seat frame 180 as connected to a vehicle floor 130 via the bushing assembly provided in one or more embodiments of the present invention. During the actual assembling process, there may be other components connected to the seat frame 180, a non-limiting example thereof being a seat cushion. To better illustrate the structure of the bushing assembly, exemplary accessories and components such as cushions or coverings layer are eliminated. To better explain the connection of the seat frame 180, a seat cushion 190 is shown in broken line as illustratively depicted in FIG. 1A.

As shown in FIG. 1A, along a width or longitudinal or axial direction A the seat frame 180 includes a first side 182 and an opposing second side 184, a first bushing 110 is connected to the first side 182, where a second bushing 120 is connected to the second side 184. As detailed herein elsewhere, the first bushing 110 and the second bushing 120 are asymmetrical, which is believed to help solve issues associated with "blind fitting," such that one may locate with relatively greater ease a side or structure corresponding to one of the first and second bushings 110, 120, while the other providing relatively more forgiving clearance to ensure a resultant connection for the seat frame 180. During installation, certain structures of the seat frame 180, possibly including the first and second bushing 110,120, may not be readily visible to the operator due to the existence of accessories such as the cushion 190. These uncertainties may be reduced or eliminated with the help of the bushing assembly described herein according to one or more embodiments of the present invention.

Figure 2:
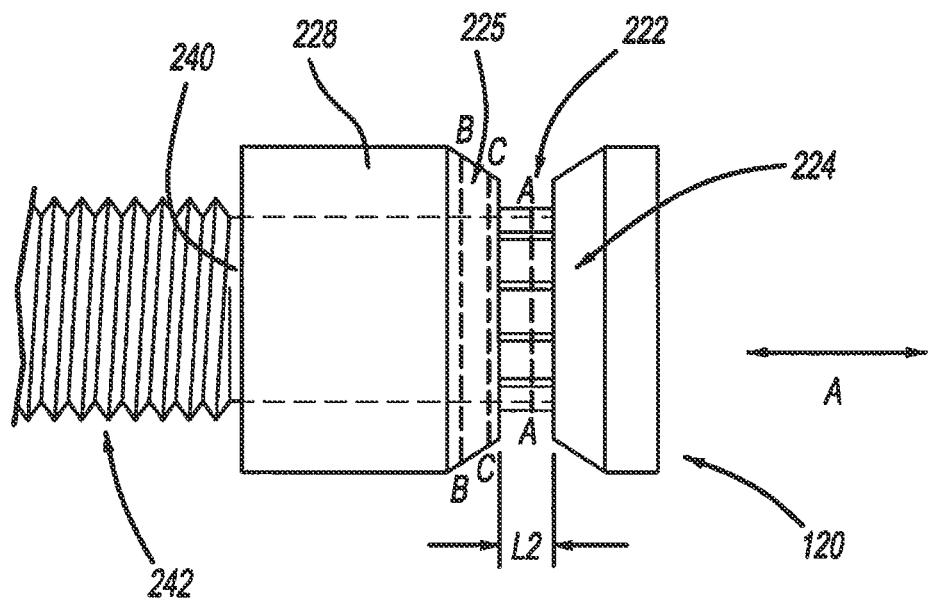
FIG. 2 is an enlarged side view of a second bushing of the bushing assembly depicted in FIG. 1A and FIG. 1B in accordance with the present disclosure.
Figure 3:
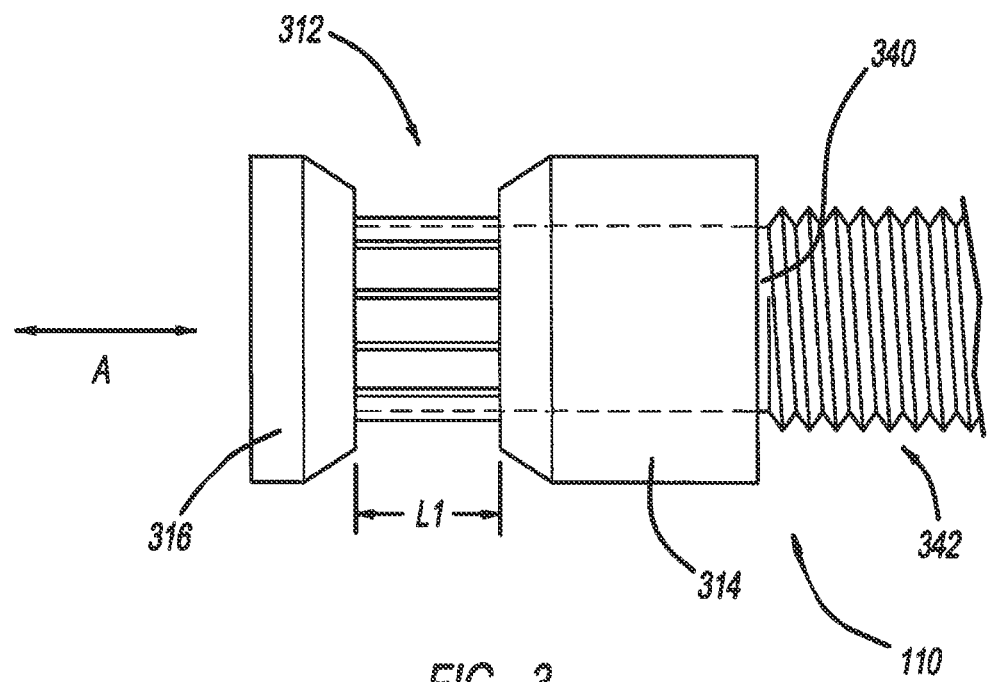
FIG. 3 is an enlarged side view of a first bushing of the bushing assembly depicted in FIG. 1A and FIG. 1B in accordance with the present disclosure.

Optionally, and as illustratively depicted in FIG. 1A in view of FIG. 2 and FIG. 3, first and second enablers 172, 174 may be provided to and positioned between the seat frame 180 and the first and second bushings 110, 120, and in particular be seated on first and second fasteners 342, 242, which respectively connect the seat frame 180 and the first and second bushings 110, 120. The first and second enablers 172, 172 may be optionally employed to provide extended connection for the first and second fasteners 342, 242 and/or to provide points of contact for supplemental parts to the seat frame 180.

Figure 1B:
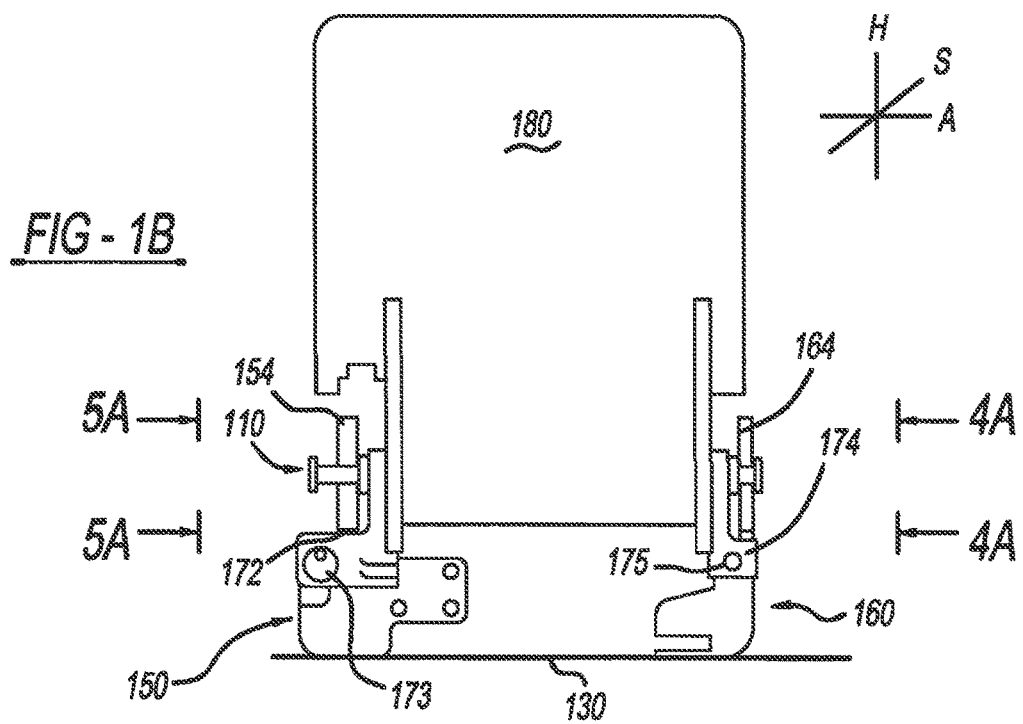
FIG. 1B is a front view of the seat frame in FIG. 1A connected to the vehicle floor via a vehicle bracket in accordance with the present disclosure.

For instance, and as illustratively depicted in FIG. 1A and FIG. 1B, and further in view of FIG. 4A and FIG. 4B, the first enabler 172 may be connected to and supported on a first bracket 150 via connecting parts 173 and 473, and the second enabler 174 may be connected to and supported on a second bracket 160 via connecting parts 175 and 475.

FIG. 1B illustratively depicts the seat frame 180 of FIG. 1A in connection with brackets 150. 160. The seat frame 180 of FIG. 1A is shown to be connected to the first bracket 150 and the second bracket 160 via the first bushing 110 and the second bushing 120, respectively. The first and second brackets 150, 160 may be directly connected and fixed to the vehicle floor 130, or may each be independently connected and fixed to the vehicle floor via one or more intermediate connectors. The first and second brackets 150, 160 are depicted in FIG. 1B to be of different shapes and/or configurations to accommodate for connection to one or more other structural components, such as another seat frame or an armrest console next to the second side 184 of the seat frame 180. The first and second brackets 150, 160 may be of similar or different shape, construction and/or configuration in other designs and uses, as long as they function to connect the seat frame 180 to the vehicle floor and accordingly support the connection.

Structures of the first bushing 110 and the second bushing 120 according to one or more embodiments of the present invention are additionally detailed with reference to FIGS. 2-3.

FIG. 2 illustratively depicts the second bushing 120 according to one or more embodiments. The second bushing 120 may have a hollow interior along the width or longitudinal or axial direction A allowing the second fastener 242 to be received therethrough and be connected to the seat frame 180, non-limiting examples of the second fastener 242 including metallic rods, such as bolts, screws, and pins. Referring back to FIG. 2, the second bushing 120 defines a second support portion 222 with a longitudinal length L2. The second support portion 222 is configured during installation to contact the vehicle bracket, such as the aforementioned second bracket 160.

FIGS. 4A and 4B illustratively depict side views of the second bracket 160 of FIG. 1B. In one or more embodiments, the second bracket 160 includes a second opening 462 to receive the second bushing 120 along a mounting direction H, wherein the second opening 462 is defined by a second neck portion 164, which is of a second neck width W2. The mounting direction H may be substantially perpendicular to or be of an angle in transverse direction to the vehicle floor 130. Further in view of FIG. 4B, and when the second support portion 222 is received through the second opening 462, the second neck width W2 corresponds to the second longitudinal length L2 of the second bushing 120 with a second width difference of L2 minus W2, or "L2–W2." In certain embodiments, the longitudinal width difference, or the second width difference "L2–W," is no greater than 5 millimeters (mm) to 10 mm, or no greater than 3 mm to 5 mm, to ensure a relatively tight connection therebetween.

Figure 6:
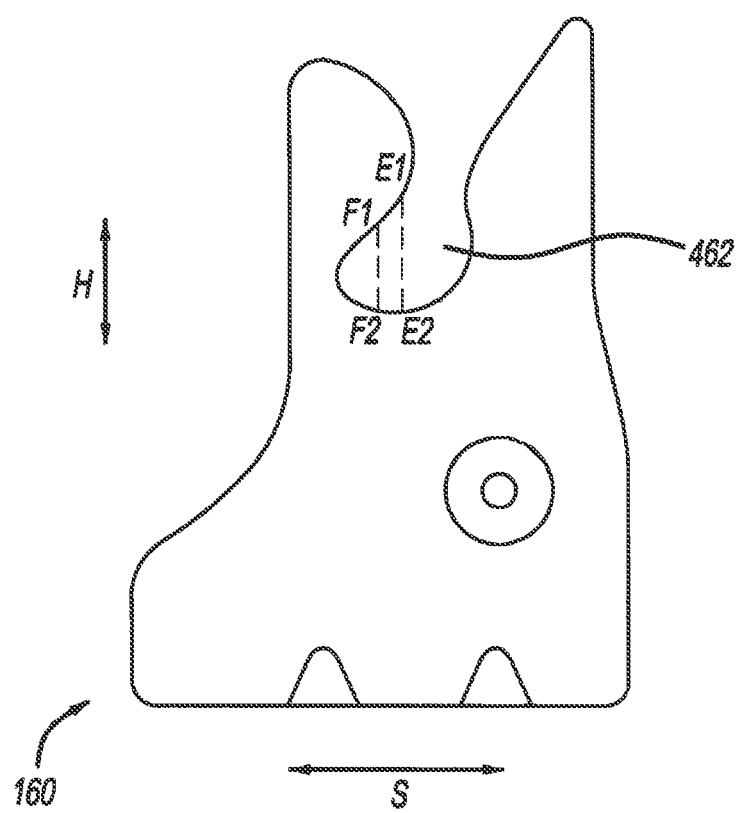
FIG. 6 is an alternative partial view of the second vehicle bracket to engage the second bushing depicted in FIG. 1B and FIG. 4A in accordance with the present disclosure.

In certain embodiments, and as illustratively depicted in FIG. 6, the second opening 462 may be of an alternative or modified configuration to reduce or limit unwanted movement along direction H of the second support portion 222 of the second bushing 120 as received through the second opening 462. During installation, the second support portion 222 first enters the second opening 462 along direction H and then along direction S, or with a suitable plus or minus to the direction H or the direction S. Without wanting to be limited to any particular theory, a forced entry under a curvature may better position the second bushing 120 against unwanted rattles, vibration, and hence noise, at least because with such entry the second bushing 120 is accordingly limited in its movement along a direction transverse or perpendicular to the vehicle floor 130. To achieve this result, the second opening 462 may be configured to have a first cross section E1E2 and a second cross section F1F2 with greater cross-sectional opening dimension than that of the first cross section E1E2, the first cross section E1E2 being positioned to contact the second support portion 222 earlier in time during installation than the second cross section F1F2. Alternatively, the second support portion 222 may contact the point E1 prior to contacting the point F1 during installation.

In certain other instances, the second opening 462 may be directed in an opposite direction along the direction S.

In certain other instances, the first opening 552 may adopt the configuration of the second opening 462 as mentioned in relation to FIG. 6.

During installation, the first bracket 150 and the second bracket 160 may first be connected to the vehicle floor 130 such that the seat frame 180 along with the first and second bushing 110, 120 may then be attached to the first and second bracket 150, 160. More installation details are provided herein elsewhere in relation to the Figures.

FIG. 3 illustratively depicts the first bushing 110 according to one or more embodiments of the present invention. Similarly, the first bushing 110 may have a hollow interior along the width or longitudinal or axial direction A allowing the first fastener 342 to be received therethrough and be connected to the seat frame, with non-limiting examples of the connector including metallic rods, such as bolts, screws, and pins. Similarly, the first bushing 110 also defines a first support portion 312, with a longitudinal length L1. Similar to what is described in relation to the second support portion 222, the first support portion 312 is to assist with positioning and installation by being configured to contact the first bracket 150.

In one or more embodiments, a cross section of the first support portion 312 is smaller in radial dimension relative to an adjacent portion such as an outer end 316 as a stop portion and an inner end 314 as a flange 340. The outer end 316 of the first support portion 312 that is further away from the seat frame 180 may be a free end, or in other words, the outer end 316 may be a part of or an extension from the first support portion 312, and may be of cross section dimensions no greater than those of the first support portion 312. Accordingly the outer end 316 does not or is not intended to impart positional restraint or limitations.

FIG. 5A illustratively depicts a side view of the first bracket 150, with a first neck width W1 defined by a first neck portion 154. The first neck width W1 is smaller in value than the first longitudinal length L1 of the first support portion 312. The configuration of L1 being comfortably greater than W1 is believed to advantageously provide relatively enhanced level of clearance to ensure a prompt engagement between the second bracket 160 and the second support portion 222 without any unnecessary or often stressful attempts to locate a similar engagement on the first side 182 by the operator, as enough clearance for the engagement is provided via the configuration of L1 being greater than W1.

Figure 5B:
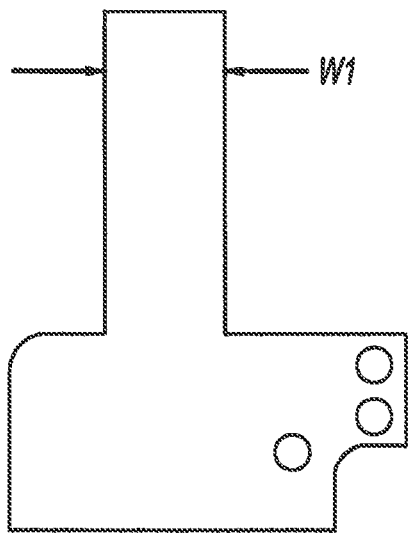
FIG. 5B is a cross-sectional view of the first vehicle bracket depicted in FIG. 5A in accordance with the present disclosure.

Further in view of FIG. 5B, and when the first support portion 312 is received through the first opening 552, the first neck width W1 corresponds to the first longitudinal length L1 of the first bushing 110 with a first width difference of L1 minus W1. In certain embodiments, the first width difference is greater than the second width difference.

As detailed herein elsewhere, a relatively tight engagement at the second side 184 between the second bracket 160 and the second support portion 222 prioritized over the connection at the first side 182 serves a relatively significant purpose, which is to ensure connection and to reduce noise or movement inherent to an otherwise connection with less extent of engagement. With the relatively enhanced engagement realized at the second side 184, relatively enhanced flexibility in extent of engagement may then be provided to the first side 182, at least because with this configuration the snug engagement at the second side 184 substantially dominates an overall connection and quality of installation of the seat frame 180 relative to the vehicle floor 130. With this, greater installation flexibility may be tolerated at the first side 182 and hence greater ease of installation. Put another way, ensuring a one-side engagement, such as the case with one or more embodiments of the present invention, is believed to be advantageously more practicable and time efficient than an otherwise method of installation where both sides may need to be precisely measured and less room for measurement and installation errors may be tolerated.

Set apart from certain existing designs involving two bushings, the bushing assembly according to one or more embodiments provides that length L2 of the second support portion 222 of the second bushing 120 is smaller than the length L1 of the first support portion 312 of the first bushing 110. The lengths L1 and L2 of the first and second support portion 312, 222 may be of any suitable values dependent upon specific requirements of the installation. L2 may be of a value to accommodate a width W2 of the second bracket 160, while the L1 may be of a value to accept the first support portion 312 with ample clearance. Without wanting to be limited to any particular theory, this configuration is believed to better secure a connection between the second support portion 222 and the second bracket 160, while leaving ample clearance via the longitudinal length L1 of the first support portion 312 to ensure with greater ease a connection to the first bracket 150. The configuration that the second support portion 222 is smaller in cross-sectional dimension L2 relative to its adjacent portions and smaller in longitudinal length relative to L1 of the first support portion 312 is believed to be advantageous in limiting movement and hence position of the seat frame 180.

It is appreciated that the first bushing 110 and the second bushing 120 may each be at either of the two sides of the seat frame 180. Instead of certain existing symmetrical designs, the asymmetrical design imparted onto the first and second bushings 110, 120 helps ensure a relatively more precise and accurate connection at one side of the seat frame 180 while allowing accommodation of connection at the other side due to the greater clearance for connection.

In one or more embodiments, the second bushing 120 may further include one or two guiding portions positioned next to the second support portion 222 to help guide the second bracket 160 onto the second support portion 222. Referring now back to FIG. 2, the second bushing 120 may further include a first guiding portion 224 and a second guiding portion 225 positioned at opposing sides of the second support portion 222. The first and second guiding portions 224, 225 may each include a guiding surface with a slope descending down toward the second support portion 222. With further reference to the second guiding portion 225, which is depicted in FIG. 2 to include a first cross section B-B and a second cross section C-C positioned between the first cross section B-B and a cross section A-A of the second support portion 222, where the cross section C-C is smaller in cross-sectional dimension relative to the first cross section B-B. A smaller cross-sectional dimension may include or refer to a smaller peripheral circumference or a smaller area of the cross section. As long as the guiding portions 224, 225 are of a configuration such that brackets, such as the second bracket 160, may be guided from the guiding portion to the second support portion 222, the configuration is considered as satisfactory. During installation, if the guiding portion, such as the first or the second guiding portion 224 or 225, first enters the opening 462 through an opening bridge 464 of the second bracket 160, the second support portion 222 will then follow naturally into the opening 462 of the second bracket 160. In certain embodiments, the first or the second guiding portion 224, 225 may not be necessary and thus may be eliminated for the installation.

The first bushing 110 is further detailed with reference to FIG. 3. As mentioned herein elsewhere, the first support portion 312 may be positioned between the outer end 316 and the inner end 314, each of which being of greater cross-sectional dimension that the first support 312. One or both of the outer end 316 and the inner end 314 may be of a configuration similar to that of the guiding portions 224, 225. Thereby, if the first bracket 150 contacts the guiding portion 224 or 225, the first support portion 312 is so guided to contact the first bracket 150.

Referring back to FIG. 2 and FIG. 3, the second bushing 120 may further include a receiving portion 228 such that the leading portion 225 is positioned between the receiving portion 228 and the second support portion 222. Alternatively, the leading portion 225 may be a natural extension or a part of the receiving portion 228. The receiving portion 228 is provided to receive and support the connection of a part of the second fastener 242, whether the second fastener 242 is already connected to the seat frame 180, or pre-fastened to the second bushing 120. By the same token, the inner end 314 of the first bushing 110 functions in a way similar to that of the receive portion 228, in receiving and supporting the connection of a part of the first fastener 342 to the seat frame 180.

Referring back again to FIG. 3, the length L1 of the first support portion 312 is substantial enough to ensure that the first bracket 150 is to fall onto and contact the first support portion 312. In certain embodiments, a guiding portion such as the inner end 314 and/or the outer end 316 may not be necessary and may be eliminated in favor of a non-guiding protrusion. Although the first support portion 312 is mainly to ensure the connection with the first vehicle bracket 150, the stop portion such as the outer end 316 may further limit relative movement of the bracket upon the connection and hence to further improve stability and to reduce the impact of NVH (noise-vibration-harshness) due to displacement and vibrations.

The first bushing 110 and the second bushing 120 referenced in FIG. 1A to FIG. 3 may be the same or may differ in material and may include a polymeric material, with non-limiting examples thereof including natural and/or synthetic polymers and polymer blends. Various parts of each of the first and second bushings 110, 120 may be pre-formed separately and thereafter connected to each other. Alternatively, the first and second bushings 110, 120 may each be formed integrally optionally via molding. When supplied as being attached to the fasteners 342 and 242, respectively, the first and second bushings 110, 120 may be formed onto the fasteners 342, 242 via injection molding to ensure process simplicity and enhanced connectivity between the parts.

Without wanting to be limited by any particular theory, according to one or more embodiments, the employment of the first bushing 110 and the second bushing 120 is believed to ease the seat installation and avoid potential mis-installation. An exemplary seat installation method according to one or more embodiments is to be described herein elsewhere.

During installation, the first and second bushings 110, 120 referenced in the FIG. 1A and FIG. 1B are respectively connected to the first and second sides 184, 182 of the seat frame 180 via connectors 242, 342 referenced in FIG. 2 and FIG. 3. Accessories such as seat cushions may be attached to the seat frame 180 before or after connection of the seat frame 180 to the bushings 110, 120 is carried out.

Before, during, or after the connection being realized between the seat frame 180 and the bushings 110, 120, the first bracket 150 and the second bracket 160 referenced in FIG. 1A and FIG. 1B may be directly or indirectly connected to the vehicle floor 130, optionally via welding and/or fasteners such as bolts and screws. As shown in FIG. 4A and FIG. 5A, the first and second brackets 150, 160 may each define an opening along the mounting direction H such as the opening 462, 552. With further reference to FIGS. 4A and 5A, the direction of the opening 462, 552 is in alignment with the mounting direction H. The step of connecting the seat frame and connecting the bracket may be carried out at the same time or in any suitable sequence.

Next, the seat frame 180 optionally along with its accessories may be installed onto the first and second brackets 150, 160 by the operator. A bushing, such as the second bushing 120, may be caused to align with the second opening 462 of the second bracket 160, and the second bushing 120 is respectively pushed into the opening of the second bracket 160. Accordingly, relatively precise alignment may be realized at the side where the second bushing 120 is located, while greater location clearance may be realized at the side wherein the first bushing 110 is located such that only one side of the two sides is positioned limiting to each the installation process. Subsequently, connectors, such as fasteners, may be used to add additional strength to the connection of the first and second brackets 150, 160 to the seat frame 180.

The bushing assembly has been described herein in relation to the seat frame 180 and further in view of FIG. 1A through FIG. 6. The bushing assembly may be employed in other seat frames and other areas such as airplanes, ships, and furniture collections where seat installation may similarly be challenged with space limitations. In one or more embodiments, the present invention is believed to have overcome certain challenges associated with seat installations by providing a pair of asymmetrical bushings to respectively provide well alignment and hence precise connection at one side, and generous allowance at the other side to ease the installation. However, one skilled in the art will readily recognize from such discussion, and from the accompanying drawings and claims that various changes, modifications and variations can be made therein without departing from the true spirit and fair scope of the invention as defined by the following claims.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "operably connected" generally means that one component functions with respect to another component, even if there are other components located between the first and second component, and the term "operable" defines a functional relationship between components.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that variations and modifications can be made on the aforementioned structure without departing from the concepts of the present invention, and further it is to be understood that such concepts are intended to be covered by the following.

What is claimed is:

1. A vehicle seat assembly, comprising:
a seat frame;
first and second polymeric bushings connected to first and opposing second sides of the seat frame, the first bushing comprising a first circumferential support portion and the second bushing comprising a second circumferential support portion, respectively, wherein the first and second support portions define a first and second longitudinal length disposed along a longitudinal direction, respectively, wherein the first longitudinal length is greater than the second longitudinal length; and
first and second brackets having first and second neck portions to respectively engage the first and second circumferential support portions, wherein a longitudinal width difference between the first circumferential support portion and the first neck portion is greater than a longitudinal width difference between the second circumferential support portion and the second neck portion, and the second circumferential support portion of the second bushing is pushed in a direction perpendicular to its axis into an opening of the second bracket during assembly;
wherein the second bushing further comprises first and second guiding portions between which is disposed the second circumferential support portion having a first and a second end along the longitudinal direction, such that the cross section of each of the first and second guiding portions is greater than that of the second circumferential support portion in circumference or radial dimension, the first guide portion comprises a guiding surface disposed at the first end, the second guide portion comprises a guiding surface disposed at the second end, and each of the guiding surfaces has a slope descending down toward the second support portion.

2. The vehicle seat assembly of claim 1, further comprising first and second metallic rods received through the first and second bushings and in contact with the first and opposing second sides of the seat frame, respectively, such that the first and second bushings are operably connected with the seat frame via the first and second metallic rods, respectively.

3. The vehicle seat assembly of claim 1, wherein at least one of the first and second guiding portions includes a first cross section and a second cross section positioned between the first cross section and the second circumferential support portion, the second cross section being smaller in circumference or radial dimension than the first cross section.

4. The vehicle seat assembly of claim 1, wherein the first bushing comprises a stop portion to be positioned at an outer distal end of the first circumferential support portion, a cross section of the stop portion being different from the first circumferential support portion in at least one of circumference and radial dimension.

5. The vehicle seat assembly of claim 4, wherein the first bushing further comprises a flange, the first circumferential support portion being positioned between the flange and the stop portion, a cross section of the flange being different from the first circumferential support portion in at least one of circumference and radial dimension.

* * * * *